Sept. 19, 1950 F. L. NICKERSON 2,522,888
RECIPROCATING GUTTER HOE CONVEYER
Filed April 8, 1947 4 Sheets-Sheet 1
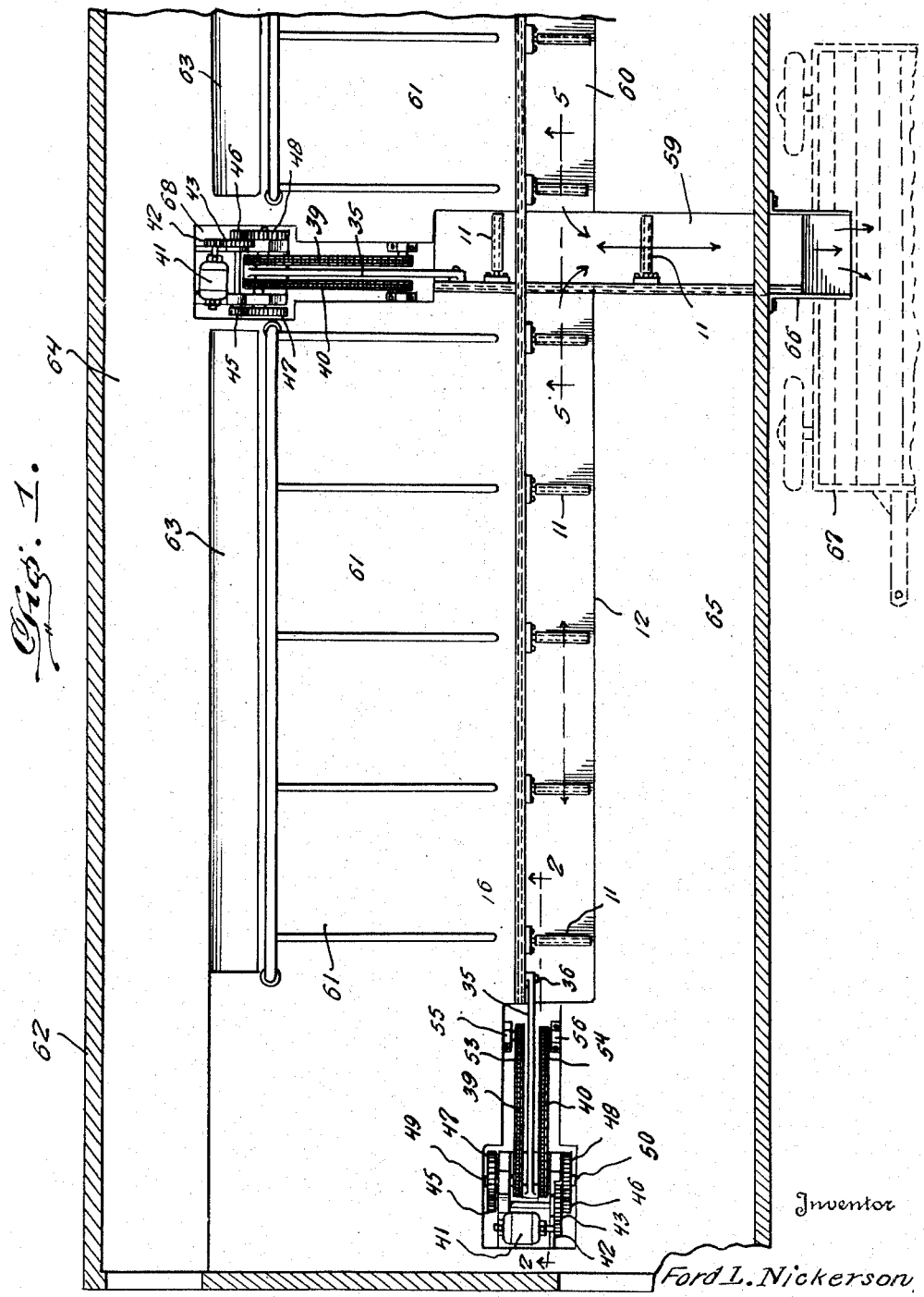
Inventor
Ford L. Nickerson Sept. 19, 1950    F. L. NICKERSON    2,522,888
RECIPROCATING GUTTER HOE CONVEYER
Filed April 8, 1947    4 Sheets-Sheet 2
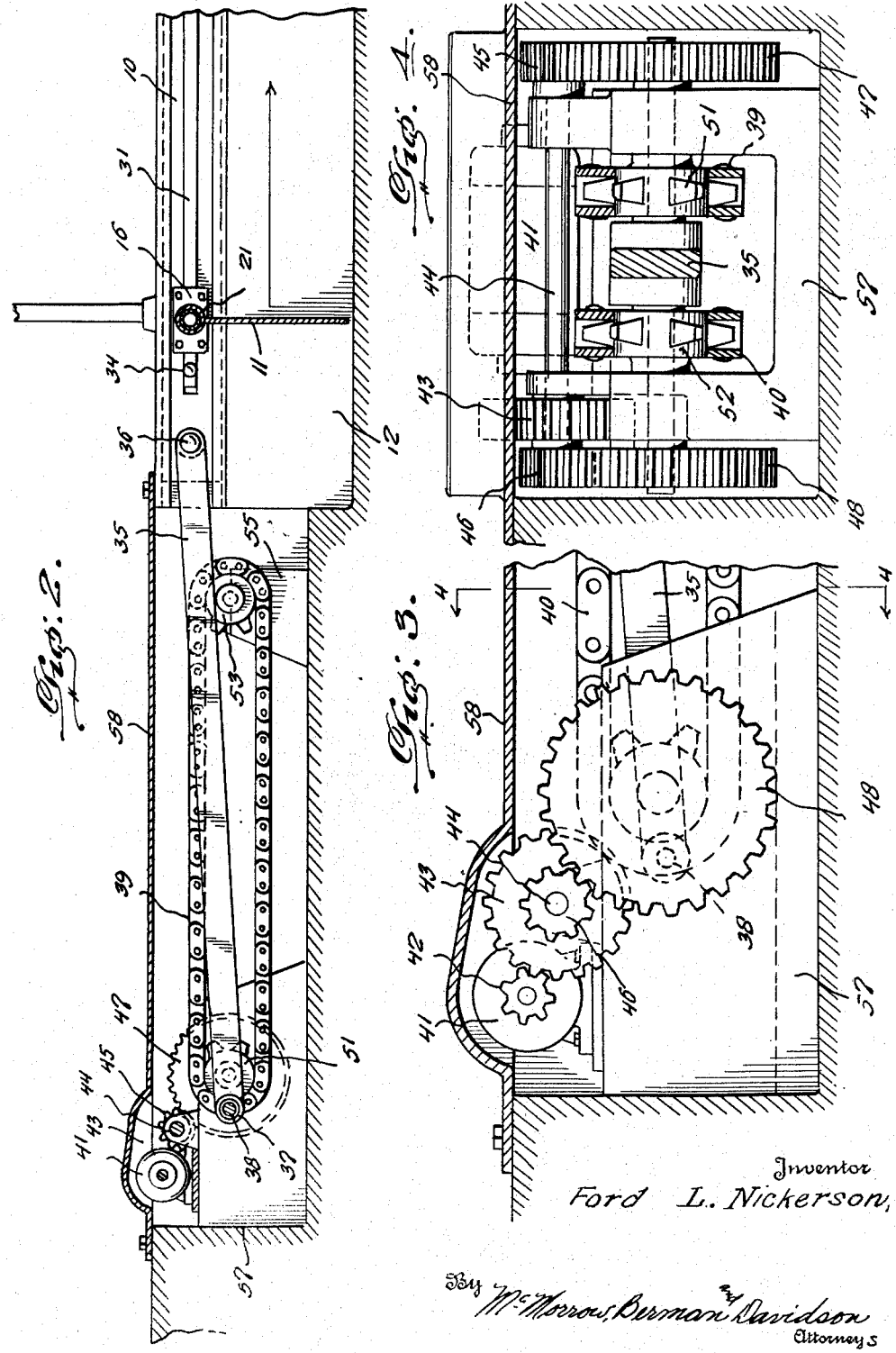
Inventor
Ford L. Nickerson,
By McMorrow, Berman & Davidson
Attorneys

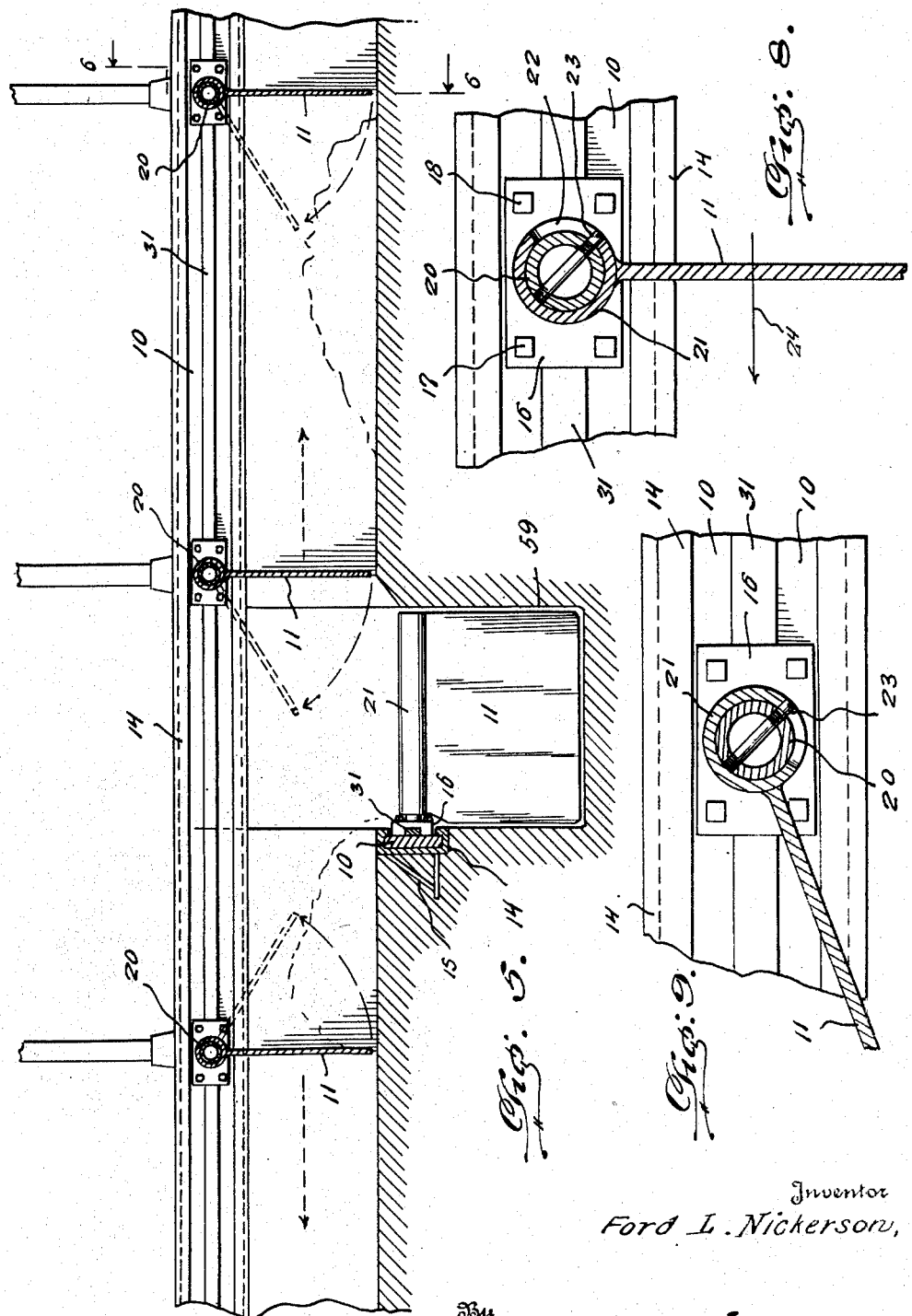

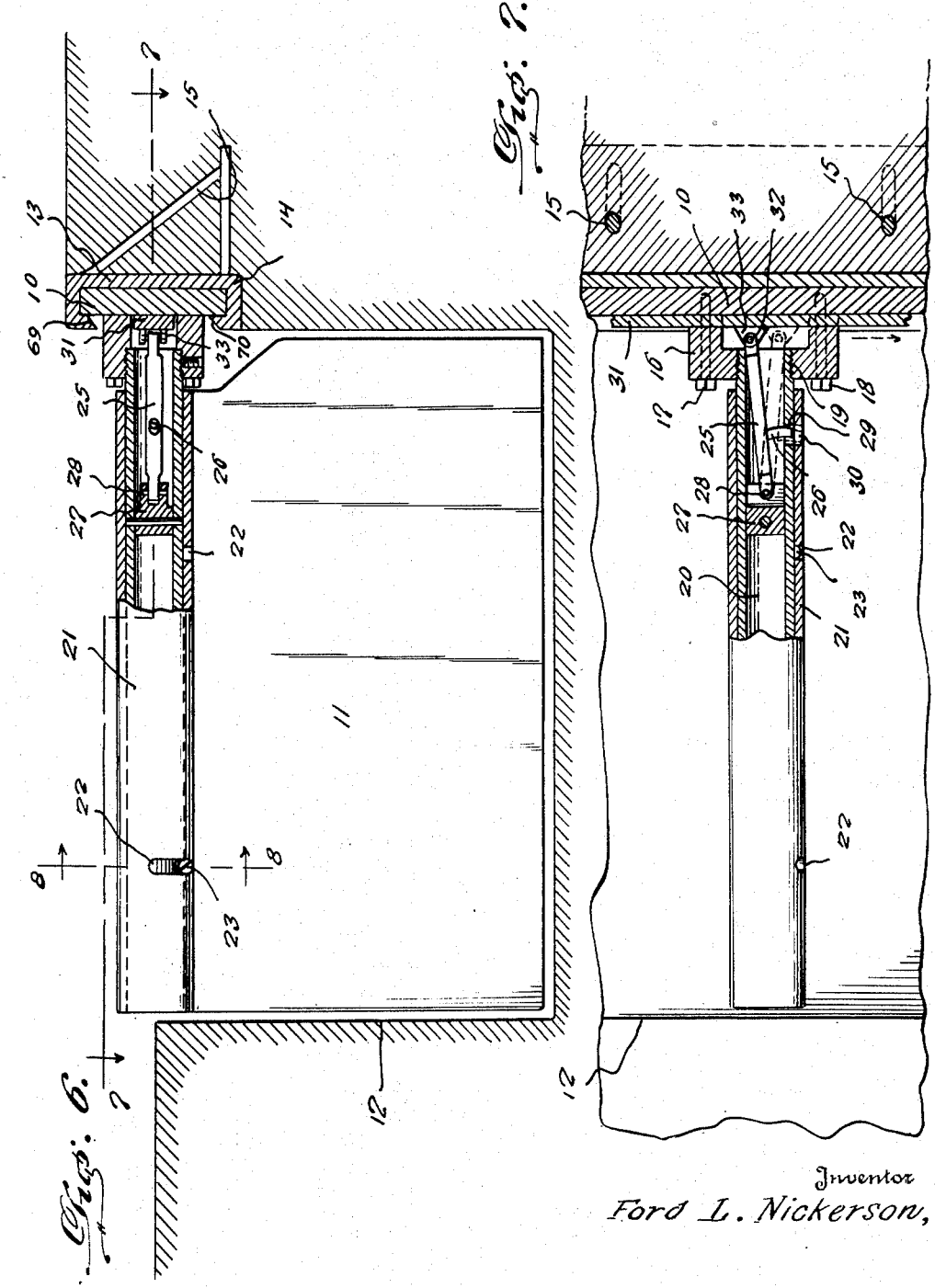

Patented Sept. 19, 1950

2,522,888

UNITED STATES PATENT OFFICE 2,522,888

RECIPROCATING GUTTER HOE CONVEYER

Ford L. Nickerson, Gilboa, N. Y.

Application April 8, 1947, Serial No. 740,225

5 Claims. (Cl. 198—224)

This invention relates to cleaning devices for stock barns, and particularly dairy barns, where rows of cows stand in parallel stalls for milking, wherein continuous litter-receiving gutters are provided at the ends of and run perpendicularly to the stalls, and in particular the invention refers to a plurality of hoes or paddles at spaced intervals along the gutters, and means for actuating the paddles through reciprocating movements, wherein litter in the gutters is worked continuously toward discharge end thereof.

The purpose of this invention is to provide mechanically actuated instrumentalities for cleaning litter-receiving gutters in cow barns and the like continuously as litter is being dropped into the gutters, or periodically as desired.

In the usual dairy barn, cows are continuously confined in stanchions or stalls for as many as seven months during cold weather except for a few minutes' exercise each day. Litter accumulates in the gutters at the ends of the stalls, and it usually requires a great deal of time each day to remove the litter. With this thought in mind, this invention contemplates mechanically operated devices in the gutters which continuously work the litter toward discharge ends of the troughs as it is dropped therein.

Due to the fact that urine is also deposited in the gutters with the litter, mechanically operating instrumentalities in gutters for this purpose are subjected to considerable abuse, and for this reason it is desirable to reduce the moving parts of a conveying device for gutters of this type to a minimum.

The object of this invention is, therefore, to provide conveying means in gutters particularly adapted for cow barns and the like, wherein litter is conveyed throughout the length of the gutter and worked toward a discharge end thereof with comparatively few operating parts.

Another object of this invention is to provide conveying means for gutters for litter in cow barns and the like wherein the only exposed parts are comparatively solid paddles or hoes extending from a covered bar in one side of the gutter.

Another object of the invention is to provide conveying means for litter in gutters of cow barns and the like, wherein cross connections may be provided, so that litter may be conveyed from behind two or more parallel rows of cows into a cross-gutter, in special cases, and thence to a discharge point.

Another object of the invention is to provide conveying means for litter in gutters of cow barns and the like wherein operating instrumentalities thereof are protected from urine and the like.

Another object of the invention is to provide conveying means for working litter and the like in gutters of cow barns toward one end thereof by reciprocating blades, wherein the blades are held in vertical position in the forward movement thereof and pivotally mounted for swinging action in the return movement, so that they may pass over litter and the like in the gutter.

Another object of the invention is to provide litter-removing conveying means for gutters of cow barns and the like which is adapted to be installed in barns now in use.

Another object of the invention is to provide mechanically operating litter-removing means for gutters of cow barns and the like that may be installed without changing the usual stalls for the cows.

Another object of the invention is to provide litter-removing means for gutters of cow barns and the like that may be actuated while cows are in the stalls.

A further object of the invention is to provide litter-conveying means for gutters of cow barns and the like which is of a simple and economical construction.

With these and other objects in view, the invention embodies a gutter positioned behind a row of stalls for cows or other stock, a longitudinally extending beam slidably mounted in one side of the gutter, paddles extending transversely across the gutter with one end hingedly atttached to the beam, and suitable mechanical instrumentalities for operating the beam with a reciprocating action.

Other features and advantages of the invention will appear from the following description taken in connection with the drawings, wherein:

Figure 1 is a sectional plan through a portion of a typical cow barn or stable illustrating a longitudinally extending gutter in combination with a transverse section of a gutter with conveying means incorporated in the gutters.

Figure 2 is a longitudinal section through the eccentric-operating mechanism at one end of a gutter, taken on line 2—2 of Figure 1.

Figure 3 is an enlarged detail showing the motor and associated gears for operating the eccentric on a slightly enlarged scale.

Figure 4 is a cross-section through the eccentric-operating mechanism, taken on line 4—4 of Figure 3.

Figure 5 is a longitudinal section through the trough and conveyor illustrated in Figure 1, taken on line 5—5 of Figure 1, showing the cross-conveyor positioned below the longitudinally extending conveyor.

Figure 6 is a typical cross-section through the conveyor and gutter, taken on line 6—6 of Figure 5.

Figure 7 is a sectional plan illustrating the connection at one end of the paddles of the conveyor, taken on line 7—7 of Figure 6.

Figure 8 is a cross-section through one of the paddles of the conveyor, taken on line 8—8 of Figure 6.

Figure 9 is a similar section showing the paddle released and actuated to the return position.

Referring now to the drawings, wherein like reference characters indicate corresponding parts, the reciprocating litter conveyor for gutters in cow barns and the like of this invention includes a reciprocating, longitudinally extending beam 10, paddles 11 and a trough 12.

In the design shown, the beam 10 is formed of a flat bar rectangularly shaped in cross-section mounted for linear movement in opposite directions, and this is slidably mounted in a socket 13, Figure 6, in a track 14 having bracing elements 15, wherein with the track embedded in one side of the gutter 12, the paddles 11 suspended outwardly therefrom will be positioned to actuate like hoes in the gutter, and mounted on the beam 10 for swinging movement about a horizontal axis.

The paddles 11 are supported in blocks 16 attached to the face of the beam 10 by screws 17 and 18, and the blocks are provided with threaded sockets 19 in which supporting tubes 20 are threaded, as shown in Figures 6 and 7. The paddles 11 are provided with hubs 21 that are pivotally or rotatably mounted on the tubes 20, and the hubs are provided with elongated slots 22 into which pins 23 on the tubes 20 extend, thereby providing means for limiting the travel of the paddles. It will be noted in Figures 8 and 9 that with the beam traveling in the direction of the arrow 24, the paddle 11 will be held in the vertical position, wherein as the paddles move lengthwise of the gutter, litter or other substances in the paths of the paddles will be scraped or hoed along the gutter. Then, as the beam is reversed and starts backward in the opposite direction, the paddles are free to rotate about the axis until the pins 23 are engaged by the opposite ends of the slots 22 with the paddles assuming the position illustrated in Figure 9, wherein the paddles may ride over the litter or other substances in the gutters. By this means the paddles may be actuated continuously, and with the starting movement of one paddle overlapping the finishing movement of the preceding paddle, the litter in the gutters will be continually worked toward a discharge end.

The paddles are also provided with locking means by which they may be held in the vertical position when not in use to prevent injury to cows or other stock, and for this reason levers 25 with pins 26 thereon are pivotally mounted in the tubes 20 on blocks 27 through pins 28, and with the levers mounted in this manner, the pins 26 are positioned to register with openings 29 and 30 in the tubes 20 and hubs 21 respectively, with the paddles in the vertical position, wherein, with the pins 26 extending through the openings 29 and 30, the paddles will be held in the vertical position. The free ends of the levers 25 are pivotally attached to a slidable bar 31 by pins 32 in projections 33 on the bar, and when it is desired to lock the paddles, the bar 31 is moved forward in the direction of the dotted arrow shown in Figure 7, wherein the lever 25 moves from the full line position to the position indicated in dotted lines. The bars 31 are slidably mounted in the blocks 16 on the beam 10, and may be actuated by knobs or pins 34 shown in Figure 2.

The beams 10 may be reciprocated or slidably actuated in the tracks 14 by any suitable means, and in the design shown, these beams are actuated by an eccentrically mounted actuating bar or pitman 35 with one end pivotally mounted on the beam 10 through a pin 36, as shown in Figure 2, and with the opposite end provided with a hub 37 through which extends a journal pin 38, the ends of the journal pin being connected to chains 39 and 40. The chains 39 and 40 are driven through a transmission, as illustrated in Figures 1, 2, 3, and 4, by a motor 41 with a pinion 42 thereon that meshes with a gear 43 on a shaft 44, and, as shown, the shaft 44 is provided with pinions 45 and 46 that mesh with gears 47 and 48 on shafts 49 and 50. The shafts 49 and 50 are provided with sprockets 51 and 52 over which the chains 39 and 40 are trained, the chains being also trained over the idler sprockets 53 and 54 mounted on suitable shafts in bearings 55 and 56, as shown. It will be noted that as the motor is started, the gears of the transmission will actuate the chains 39 and 40, wherein the pin 38 will be carried around following the pitch of the chains and the beam 10, through the bar 35, will slide back and forth following the pin 38. The transmission is mounted in a suitable pit 57 at the high or starting end of the gutter and the pits may be enclosed by a suitable cover plate 58, as shown in Figures 2 and 3.

With the parts assembled and operating in this manner, it will be noted, particularly in Figure 1, that litter and the like in the gutter 12 may be worked along toward a cross-gutter, as indicated by the numeral 59 and by reversing the position of the pin 23 and slot 22 in the paddles of an opposite end 60 of the gutter 12, the litter from the opposite end may also be worked toward the cross-gutter 59. It will be also understood that the cross-gutter 59 may convey the litter from two or more parallel gutters to a common exit.

In the design illustrated in Figure 1, the gutter is shown as positioned behind stalls 61 in a barn or stable 62, with a feed trough at the forward ends of the stalls and walks 64 and 65 at the sides. The cross-gutter 59 is illustrated as depositing litter in a chute 66 from which the litter may be deposited in a wagon or truck, as indicated in dotted lines 67. The gutter 59 is provided with operating transmission elements in a pit 68 similar to the pit 57, and it will be understood that similar transmission elements may be used in combination with gutters or conveyors at various points in the barn or stable.

With the parts assembled in this manner, substantially all moving parts are covered and protected from moisture. To facilitate draining fluids from the track 14, and prevent seepage back into the channel, the outer edges 69 and 70 of the track are beveled, as shown in Figure 6.

It will also be understood that modifications may be made in the design or arrangement of the parts without departing from the spirit of the invention.

What is claimed is:

1. In a hoe conveyor for cleaning gutters of cow barns and the like, the combination, which comprises a track installed in one side of a gutter, a longitudinally disposed beam slidably mounted in said track, a plurality of paddles transversely positioned in the gutter, tubes mounted on the exposed face of the beam extending transversely across the gutter, said paddles having hubs pivotally mounted on the tubes, said hubs having slots positioned to receive pins extending from the tubes, said slots and pins holding the paddles in vertical positions with the beam traveling in one direction and permitting the paddles to assume positions other than vertical with the beam traveling in the opposite direction, and means reciprocating the beam.

2. In a hoe conveyor for cleaning gutters of cow barns and the like, the combination, which comprises a track installed in one side of a gutter, a longitudinally disposed beam slidably mounted in said track, a plurality of paddles transversely positioned in the gutter, tubes mounted on the exposed face of the beam extending transversely across the gutter, said paddles having hubs pivotally mounted on the tubes, said hubs having slots positioned to receive pins extending from the tubes, said slots and pins holding the paddles in vertical positions with the beam traveling in one direction and permitting the paddles to assume positions other than vertical with the beam traveling in the opposite direction, means locking the paddles in vertical position, and means reciprocating the beam.

3. In a hoe conveyor for cleaning gutters of cow barns and the like, the combination, which comprises a track installed in one side of a gutter, a longitudinally disposed beam slidably mounted in said track, a plurality of paddles transversely positioned in the gutter, tubes mounted on the exposed face of the beam extending transversely across the gutter, said paddles having hubs pivotally mounted on the tubes, said hubs having slots positioned to receive pins extending from the tubes, said slots and pins holding the paddles in vertical positions with the beam traveling in one direction and permitting the paddles to assume positions other than vertical with the beam traveling in the opposite direction, a bar slidably mounted on the face of the beam, locking means incorporated in the hubs of the paddles, and means connecting the bar to the locking means wherein the paddles may be locked in vertical positions from an end of the beam.

4. In a hoe conveyor for cleaning a cow barn gutter, a track arranged along a side face of said gutter and supported in the latter, a beam positioned within said track and mounted for linear movement in opposite directions, a plurality of paddles each vertically disposed transversely of said gutter and spaced from each other, tubes mounted on the exposed face of said beam and extending transversely across said gutter, each of said paddles being provided with a hub, the hubs of said paddles being mounted on said tubes for swinging movement about the latter, co-acting means carried by said tubes and engaging said hubs actuable upon execution of the linear movement of said beam in one direction to hold the paddles in vertical positions and actuable upon execution of the linear movement of the beam in the opposite direction to permit the paddles to be swung to positions other than vertical, and means operatively connected to said beam for effecting the linear movement of the latter.

5. In a hoe conveyor for cleaning a cow barn gutter, a track arranged along a side face of said gutter and supported in the latter, a beam positioned within said track and mounted for linear movement in opposite directions, a plurality of paddles each vertically disposed transversely of said gutter and spaced from each other, tubes mounted on the exposed face of said beam and extending transversely across said gutter, each of said paddles being provided with a hub, the hubs of said paddles being mounted on said tubes for swinging movement about the latter, co-acting means carried by said tubes and engaging said hubs actuable upon execution of the linear movement of said beam in one direction to hold the paddles in vertical positions and actuable upon execution of the linear movement of said beam in the opposite direction to permit the paddles to be swung to positions other than vertical, means operatively connected to said beam for effecting the linear movement of the latter, and inter-engaging means on said tubes and said hubs and operable from without said hubs for locking the paddles in vertical position.

FORD L. NICKERSON.

REFERENCES CITED

The following references are of record in the file of this patent:

UNITED STATES PATENTS

| Number | Name | Date |
|---|---|---|
| 351,065 | Conger et al. | Nov. 2, 1886 |
| 544,031 | Draver | Aug. 6, 1895 |
| 668,050 | Peck | Feb. 12, 1901 |
| 1,440,378 | Davis | Jan. 2, 1923 |
| 2,416,469 | Cordis | Feb. 25, 1947 |